R. A. HUNARIAN.
TOY HORSEMOBILE.
APPLICATION FILED AUG. 19, 1920.

1,377,888. Patented May 10, 1921.

Inventor,
Rafael A. Hunarian

Witness.
L. Putnam

UNITED STATES PATENT OFFICE.

RAFAEL ASTOR HUNARIAN, OF SAN FRANCISCO, CALIFORNIA.

TOY HORSEMOBILE.

1,377,888.       Specification of Letters Patent.    Patented May 10, 1921.

Application filed August 19, 1920. Serial No. 404,536.

*To all whom it may concern:*

Be it known that I, RAFAEL A. HUNARIAN, a citizen of the United States, and a resident of San Francisco, county of San Francisco, State of California, have invented a new and useful Toy Horsemobile, of which the following is a specification.

My invention relates in general to toys, and has reference more particularly to a toy vehicle or rather a combined hobby horse and vehicle.

Among the objects my invention is to produce a so called horsemobile with the same so constructed that the rider will experience realistic conditions in riding the toy, to which end one feature of the invention resides in providing means whereby the steering wheels of the vehicle may be guided by the reins, which pass through the mouth of the horse, and coöperate with means arranged hidden within the body of the horse and connected in steering relation with the steering wheels.

A further object of the invention is to provide propelling means for the traction wheels of the vehicle, which means are likewise hidden within the body of the vehicle, and preferably operated through the manipulation of the stirrup straps.

Figure 1:
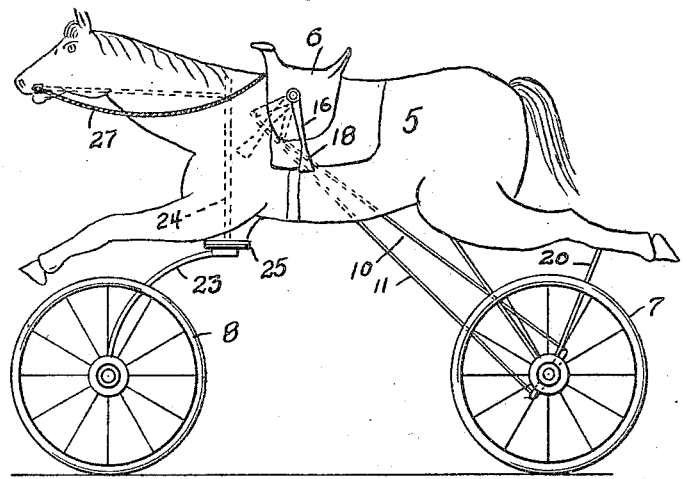
Figure 2:
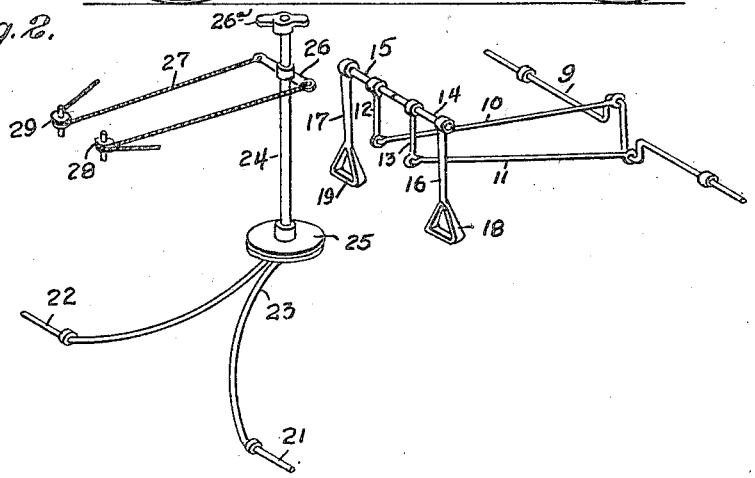

With these and further objects in view the invention will be further described with reference to the illustrative embodiment shown in the accompanying drawing, and in which Figure 1 is a side elevation of the toy illustrating the application of the invention; Fig. 2 is a perspective view of the steering means, and the propelling means apart from the supporting and housing structure.

Referring now to the drawing in detail I prefer to provide a wheeled carriage upon which the horse 5 is mounted and with the same having a saddle 6 adapted to be occupied by the rider.

The wheeled carriage will include the rear traction wheels 7 and the front traction wheels 8; the former being mounted upon an axle 9, which will include a crank shaft with the drive rods 10 and 11 connected to the crank thereof and extending through the horse, and with their opposite ends connected to the links or short levers 12 and 13, which are fixed upon the short shafts 14 and 15 journaled within the horse and extending through the opposite sides thereof. Mounted upon the outer ends of the shafts 14 and 15 are the stirrup levers 16 and 17, which terminate in the stirrups 18 and 19.

The horse may be supported upon the traction wheels 7 in any convenient manner, for instance, by the supports 20.

As a combined means for mounting the horse upon the steering wheels 8 and to also provide a steering gear I propose to employ a pair of short axles 21 and 22, which are carried by the downwardly presented ends of the yoke 23 with the steering post 24 on the yoke adapted to extend vertically within the horse, and having a plate or plates 25 arranged as a bearing surface for the horse to rest upon, and at the same time enabling the yoke to be turned independent thereof. Arranged on the post 24 is a steering arm 26 around which a cable or cord 27 is passed and presented forwardly of the horse's neck with a pair of smaller wheels or pulleys 28 and 29 arranged on opposite sides of the horse's mouth so that the cable or cord 27 may be passed around these elements and presented rearwardly on the outside of the neck in a position where it may be grasped by the rider and manipulated practically in the same manner as guiding a horse.

A suitable bracket 26ª is employed to brace the steering post at the top.

From the above construction it will be readily appreciated that by imparting a pull on one side of the reins the steering arm 26 will impart a turning effect to the yoke 23 and through it to the steering wheels 8 whereby the toy may be guided while the rider thereof is actuating the stirrups back and forth with his feet to impart a cranking action to the axle 9 with the cranking arrangement driving the traction wheels 7.

I claim:

In a toy of the class described, a toy horse, a seat upon the horse, levers extending downwardly on opposite sides of the horse and comprising foot rests for an occupant of the seat, short transverse shafts journaled within the body of the horse and protruding from the sides of the seat, said levers being fixed to the ends of said shafts, links fixed to the shafts within the body of the horse, rods connected to the free ends of said links and extending rearwardly and downwardly through the horse with their opposite ends connected to a crank, said crank comprising an axle with traction wheels for the toy mounted thereon, steering wheels mounted forward of said traction wheels, a downwardly curved fork for supporting the horse on the steering wheels, the ends of said fork terminating in outwardly presented axles for the steering wheels with its opposite meeting ends supporting a plate which in turn provides a rest for the forward part of the horse, a steering post extending vertically within the horse and fixed to said plate, a T-head at the top of said post having an abutment with the top interior of the horse, a transverse cross arm fixed to said post below said T-head, pull cords attached to the ends of said arm, said cords extending forward within the neck of the horse and out of the mouth thereof, pulleys in the corners of the horse's mouth and around which the cords pass rearwardly on the outside of the horse's neck where they may be manipulated by an occupant of the seat for effecting a steering movement of the steering wheels.

RAFAEL ASTOR HUNARIAN.